(12) United States Patent
Imaeda

(10) Patent No.: US 8,884,522 B2
(45) Date of Patent: Nov. 11, 2014

(54) HEADLAMP LIGHT DISTRIBUTION CONTROL DEVICE

(75) Inventor: Koji Imaeda, Inazawa (JP)

(73) Assignee: Denso Corporation, Kariya (JP)

( * ) Notice: Subject to any disclaimer, the term of this patent is extended or adjusted under 35 U.S.C. 154(b) by 184 days.

(21) Appl. No.: 13/556,519

(22) Filed: Jul. 24, 2012

(65) Prior Publication Data

US 2013/0026916 A1 Jan. 31, 2013

(30) Foreign Application Priority Data

Jul. 28, 2011 (JP) ................................ 2011-165657

(51) Int. Cl.
 *B60Q 1/02* (2006.01)
 *B60Q 1/14* (2006.01)

(52) U.S. Cl.
 CPC ............ *B60Q 1/143* (2013.01); *B60Q 2300/41* (2013.01); *B60Q 2300/056* (2013.01); *B60Q 2300/42* (2013.01)
 USPC ............................... 315/82; 362/460; 362/465

(58) Field of Classification Search
 USPC ...................... 315/82; 362/460, 464, 465, 466
 See application file for complete search history.

(56) References Cited

U.S. PATENT DOCUMENTS

| | | | |
|---|---|---|---|
| 8,552,648 B2 * | 10/2013 | Hayakawa | 315/82 |
| 2008/0084165 A1 | 4/2008 | Otsuka et al. | |
| 2008/0088481 A1 | 4/2008 | Kumon et al. | |
| 2009/0086497 A1 * | 4/2009 | Kamioka et al. | 362/466 |

FOREIGN PATENT DOCUMENTS

| | | |
|---|---|---|
| JP | 06-267303 | 9/1994 |
| JP | 07-182484 | 7/1995 |
| JP | 2008-037240 | 2/2008 |
| JP | 2008-094127 | 4/2008 |
| JP | 2008-094249 | 4/2008 |
| JP | 2008-110723 | 5/2008 |
| JP | 2008-114800 | 5/2008 |

* cited by examiner

*Primary Examiner* — Tuyet Vo
*Assistant Examiner* — Henry Luong
(74) *Attorney, Agent, or Firm* — Harness, Dickey & Pierce, PLC

(57) ABSTRACT

An extraction unit extracts a forward vehicle from an acquired image of the forward area image. A judgment unit extracts a lamp of the forward vehicle from the image of the extracted forward vehicle if a distance to the forward vehicle is less than a predetermined value, and judges whether the extracted lamp is actually two lamps or a single lamp. A control unit controls an irradiation direction of a headlamp such that a first shielded area is set in an irradiation area to prevent an area including the lamp of the forward vehicle from being irradiated if judged that the extracted lamp is actually two lamps, and such that a second shielded area is set in the irradiation area to have a margin in right and left directions larger than the first shielded area if judged that the extracted lamp is really only a single lamp.

4 Claims, 4 Drawing Sheets

| DISTANCE [m] | 0~10 | 10~100 | 100~500 |
|---|---|---|---|
| LAMP WIDTH [m] | 2 | 1 | 0.5 |
| MARGIN ANGLE [deg] | 15 | 8 | 5 |

HEADLAMP LIGHT DISTRIBUTION CONTROL DEVICE

CROSS-REFERENCE TO RELATED APPLICATION

This application is based on and claims the benefit of priority from earlier Japanese Patent Application No. 2011-165627 filed Jul. 28, 2011, the description of which is incorporated herein by reference.

BACKGROUND OF THE INVENTION

1. Field of the Invention

The present invention relates to a headlamp light distribution control device that performs switching control of an irradiation direction of a vehicular headlamp.

2. Description of the Related Art

In the related art, there has been known a device that automatically switches an irradiation direction of a vehicular headlamp (headlight) to be moved up and down based on whether or not a vehicle is present in front of own vehicle. This device detects a lamp such as a tail lamp (tail light) mounted in a forward vehicle from an image of an area in front of own vehicle obtained by a camera. If a lamp is detected, the device judges that the forward vehicle etc. is present, and then switches an irradiation direction of a headlamp of own vehicle (see, e.g., JP-A-2008-037240).

In addition, there has been known a method called "ADB (adaptive driving beam)" that is used for controlling an irradiation direction of a vehicular headlamp so as to be displaced laterally outwardly, if a forward vehicle is present, in order to prevent a driver of the forward vehicle from being dazzled by irradiating the headlamp of own vehicle to the forward vehicle.

In the related art, the lamp of the forward vehicle is detected based on only the image obtained by the camera. In this case, for example, if a distance to the forward vehicle is large, a tail lamp actually composed of a pair of lamps cannot be judged as being two lamps, but may be judged as being one lamp, due to the finite resolution of the camera.

The above judgment that the tail lamp is one lamp may be caused by malfunction of either of two lamps, or by the finite resolution of the camera despite normal lighting of both of two lamps. This makes it difficult to determine why the pair of lamps mounted in the forward vehicle is judged as being composed of one lamp.

ADB control is performed so as to irradiate the outside of the lamp. Due to this, if one of two lamps is malfunctioning and then cannot be lit, the outside of the other of two lamps which is lit is irradiated. This results in irradiation of a seat position of the driver of the forward vehicle, thereby dazzling the driver of the forward vehicle.

SUMMARY

The present disclosure provides a headlamp light distribution control device which is able to control an irradiation direction of a headlamp so as to prevent a driver of a forward vehicle from being dazzled, even if one of a pair of lamps mounted in the forward vehicle is not lit.

According to a first aspect of the present disclosure, there is provided a headlamp light distribution control device for a vehicle, including an image acquisition unit, an extraction unit, an distance acquisition unit, a judgment unit, and a control unit.

The image acquisition unit acquires an image of a forward area of own vehicle. The extraction unit extracts a forward vehicle from the acquired image of the forward area to produce an image of the extracted forward vehicle. The distance acquisition unit that acquires a distance from own vehicle to the forward vehicle.

The judgment unit extracts a lamp configured by a pair of lamps mounted in the forward vehicle from the image of the extracted forward vehicle to produce an image of the extracted lamp, if the distance acquired by the distance acquisition unit is less than a predetermined value, and judges whether the extracted lamp is in a both lamps lit state or in an single lamp lit state.

Here, a "both lamps lit state" refers to a state where both of a pair of lamps such as headlamps or tail lamps are lit. An "single lamp lit state" refers to a state where only one a pair of lamps is lit due to malfunction thereof etc.

The control unit controls an irradiation direction of a headlamp of the own vehicle such that a first shielded area is set in an irradiation area of the headlamp of the own vehicle so as to prevent an area including the lamp of the forward vehicle from being irradiated, if judged that the extracted lamp of the forward vehicle is in the both lamps lit state, and such that a second shielded area is set in the irradiation area of the headlamp of own vehicle so as to have a margin in right and left directions larger than the first shielded area, if judged that the extracted lamp is in the single lamp lit state.

According to the headlamp light distribution control device, an irradiation direction of a headlamp can be controlled so as to prevent a driver of a forward vehicle from being dazzled, even if one of the pair of lamps mounted in the forward vehicle is not lighting. This reason is explained in detail below.

When an image of a forward area of the own vehicle is acquired by the image acquisition unit, a forward vehicle is extracted from the acquired image of the forward area image to produce an image of the extracted forward vehicle and then a lamp mounted in the forward vehicle is extracted from the image of the extracted forward vehicle. This may make it difficult to judge whether the extracted lamp is in the single lamp lit state or the both lamps lit state depending on, e.g., an image acquisition performance of the image acquisition unit such as a resolution, or a method for extracting the forward vehicle, if a distance to the forward vehicle is large.

In contrast, in the headlamp light distribution control device of the present disclosure, the judgment unit performs an extraction of the lamp and an judgment on whether the lamp is in the both lamps lit state or the single lamp lit state, if the distance acquired by the distance acquisition unit is less than the predetermined value.

Therefore, the headlamp light distribution control device can precisely perform an extraction of the lamp and an judgment on whether the lamp is in the single lamp lit state or in the both lamps lit state, by setting the predetermined value based on an image acquisition performance of the image acquisition unit such as a resolution, or a method for extracting the forward vehicle.

As a lamp which is mounted outside a vehicle body and is not blinking during a predetermined period, the forward vehicle frequently uses a lamp composed of a pair of lamps such as a headlamp or a tail lamp mounted in the right and left sides of the vehicle body.

Thus, when a headlamp of own vehicle is irradiated, if judged that the lamp of the forward vehicle is in the both lamps lit state, a first shielded area is set in an irradiation area of the headlamp of own vehicle so as to prevent an area including the pair of lamps of the forward vehicle from being irradiated. This can prevent a driver of the forward vehicle from being dazzled by the headlamp.

On the other hand, if judged that the lamp is in the single lamp lit state, there is a high possibility that one of the pair of lamps composed of the lamp mounted in the forward vehicle is not lighting due to, e.g., malfunction.

In this case, it is difficult to realize which lamp of the lamps on the right and left sides of the forward vehicle has malfunctioned. Due to this, a second shielded area is set to have a right and left margins larger than the first shielded area which is set when the lamp is judged as being in the both lamps lit state.

Then, even if which lamp of two lamps on the right and left sides of the forward vehicle has malfunctioned, the forward vehicle cannot be irradiated. This can also prevent a driver of the forward vehicle from being dazzled by irradiation of the headlamp.

Thus, the headlamp light distribution control device can precisely perform a judgment on whether the lamp is in the single lamp lit state or in the both lamps lit state, and therefore, an irradiation area of the headlamp can be set in an appropriate range.

Here, the "forward vehicle" refers to a vehicle which runs in front of own vehicle such as a "proceeding vehicle", which runs in the same direction as own vehicle, or an "oncoming vehicle", which runs on the opposite lane.

In the headlamp light distribution control device, the judgment unit may be configured to: calculate a distance between the two lamps of the extracted lamp; judge that the extracted lamp is in the single lamp lit state if the distance is less than a predetermined value; and judge that the extracted lamp is in the both lamps lit state if the distance is equal to or more than the predetermined value.

This can make it possible to precisely judge whether the lamp is in the single lamp lit state or in the both lamps lit state, by using a simple process to judge whether or not a distance between the two lamps of the extracted lamp is less than a predetermined value.

On the other hand, if the extracted lamp is in the single lamp lit state, the second shielded area is set in the irradiation area of the headlamp so as to have a margin in right and left directions larger than the first shielded area. In this case, if the second shielded area is always set to have a margin with a constant width and angle, the margin may be too large when the forward vehicle is far away from the own vehicle. That is, the second shielded area may be too large.

Thus, in the headlamp light distribution control device, the control unit may be configured to change the margin in right and left directions to be larger, as the distance acquired by the distance acquisition unit is smaller.

In this way, the margin in right and left of the shielded area is changed to be larger, as the distance from own vehicle to the forward vehicle is smaller. In other words, the margin in right and left directions is changed to be smaller as the distance from the own vehicle to the forward vehicle is larger. Thus, the margin can be prevented from being too large, even if the forward vehicle is far away from the own vehicle.

DETAILED DESCRIPTION OF THE PREFERRED EMBODIMENTS

An embodiment of the present invention will hereinafter be described with reference to the drawings.

Figure 1:
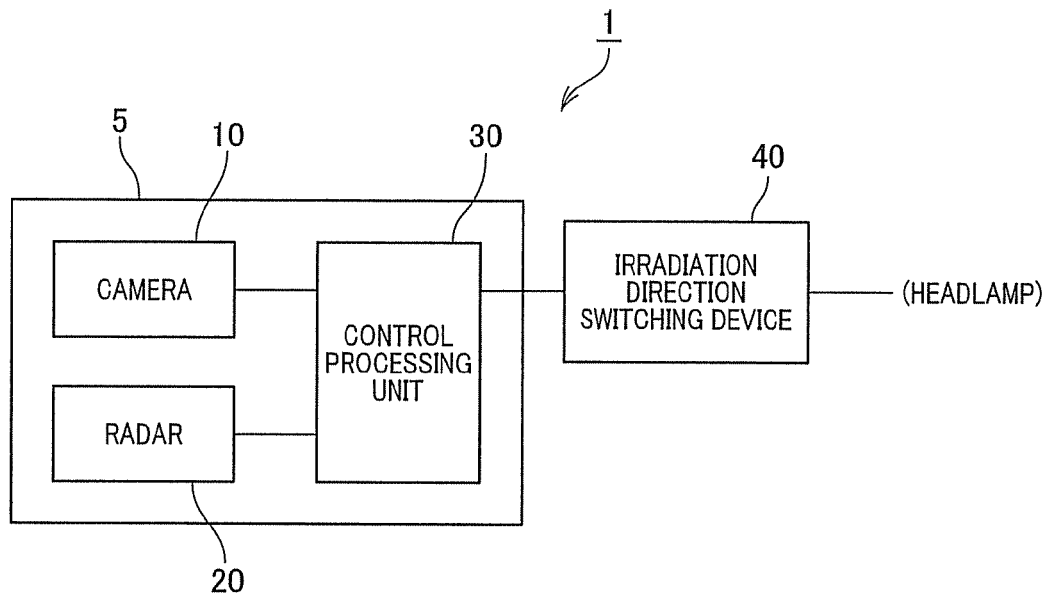
FIG. 1 is a block diagram for showing a configuration of a headlamp light distribution apparatus including a headlamp light distribution control device according to an exemplary embodiment of the present invention.

FIG. 1 is a block diagram for showing an outline of a configuration of a headlamp light distribution apparatus 1 to which a headlamp light distribution control device according to the present invention is applied. The headlamp light distribution apparatus 1 includes a headlamp light distribution control device 5 and an irradiation direction switching device 40 which is connected to headlamps (headlights) mounted in own vehicle.

The headlamp light distribution control device 5 includes a camera 10, a radar 20, and a control processing unit 30.

The camera 10 is configured by, e.g., a CCD (charge coupled device) camera or an infrared camera, and is mounted on the front side of a vehicle body or in a vehicle compartment of the own vehicle, such that an image of a forward vehicle in front of own vehicle 50 is acquired. In the present embodiment, the camera 10 corresponds to an image acquisition unit.

The radar 20 is configured by, e.g., a pulse radar or FMCW (frequency modulated continuous wave) radar, and acquires a distance from the own vehicle to the forward vehicle. In the present embodiment, the radar 20 corresponds to a distance acquisition unit.

The control processing unit 30 includes a CPU (central processing unit), a ROM (read only memory), a RAM (random access memory), and an I/O (input/output). In addition, a PGA (programmable gate array) for image processing, etc., is mounted in the control processing unit 30. In the present embodiment, the control processing unit 30 corresponds to an extraction unit, a judgment unit and a control unit.

Figure 6:
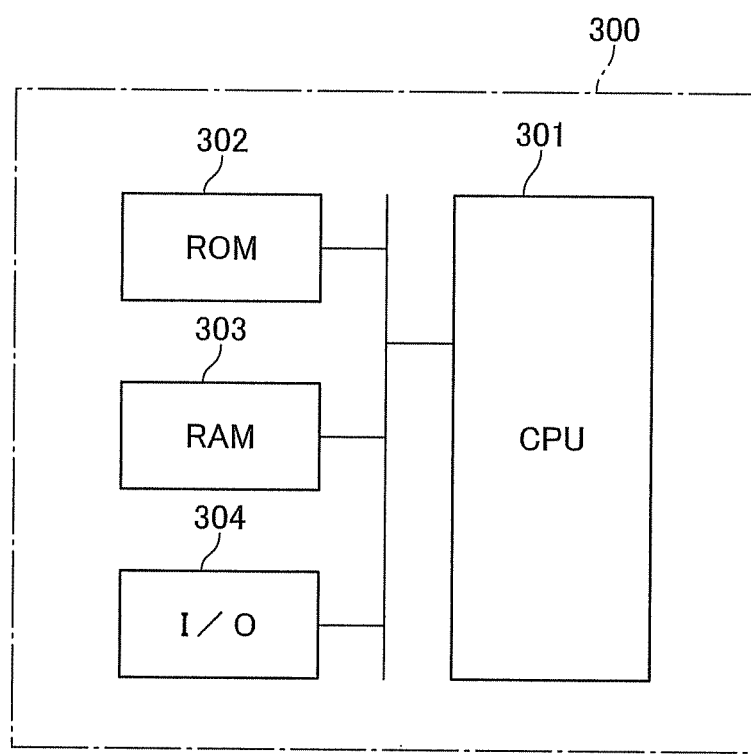
FIG. 6 is a block diagram showing a configuration of a microcomputer configuring a control processing unit of FIG. 1.

FIG. 6 shows an example of the control processing unit 30 which is configured by a microcomputer 300 that is able to be incorporated in an electronic control unit (ECU) mounted in the vehicle. The microcomputer 300 includes a CPU 301, a ROM 302, a RAM 303, and an I/O 304. In the ROM 302, a program for enabling the control processing unit 30 (i.e., the microcomputer 300) to execute at least light a distribution process as described below is stored in advance.

By using the program stored in the ROM 302, the control processing unit 30 (CPU 301) performs a light distribution process, which includes the following steps of:

(i) extracting an image of the forward vehicle in front of the own vehicle from an image of a forward area of the own vehicle acquired by the camera 10;

(ii) extracting tail lamps (tail lights) of the forward vehicle from the image of the forward vehicle extracted in step (i), if a distance from the own vehicle to the forward vehicle acquired by the radar 20 is less than a predetermined value, and judging whether the extracted lamp is in a both lamps lit state or in an single lamp lit state;

(iii) setting a shielded area (hereinafter referred to as the "first shielded area") in an irradiation area of headlamps of own vehicle so as to prevent an area including tail lamps of the lamp of the forward vehicle from being irradiated if judged that the extracted lamp of the forward vehicle is in the both lamps lit state, and setting a shielded area (hereinafter referred to as the "second shielded area") in the irradiation area so as to have a margin in right and left directions thereby making the second shielded area larger than the first shielded area if judged that the extracted lamp is in the single lamp lit state;

(iv) calculating a distance between the tail lamps of the forward vehicle extracted in step (ii), judging that the extracted lamp of the forward vehicle is in the single lamp lit state if the distance is less than a predetermined value, and judging that the extracted lamp is in the both lamps lit state if the distance is equal to or more than the predetermined value; and (v) changing the margin to be larger, as the distance from own vehicle to the forward vehicle acquired by the radar 20 is smaller.

The irradiation direction switching device 40 is a device which receives a command signal from the control processing unit 30 and, based on the received command signal, switches an irradiation direction of headlamps such that a low beam, an intermediate high beam, or a high beam for irradiation is formed.

Figure 2:
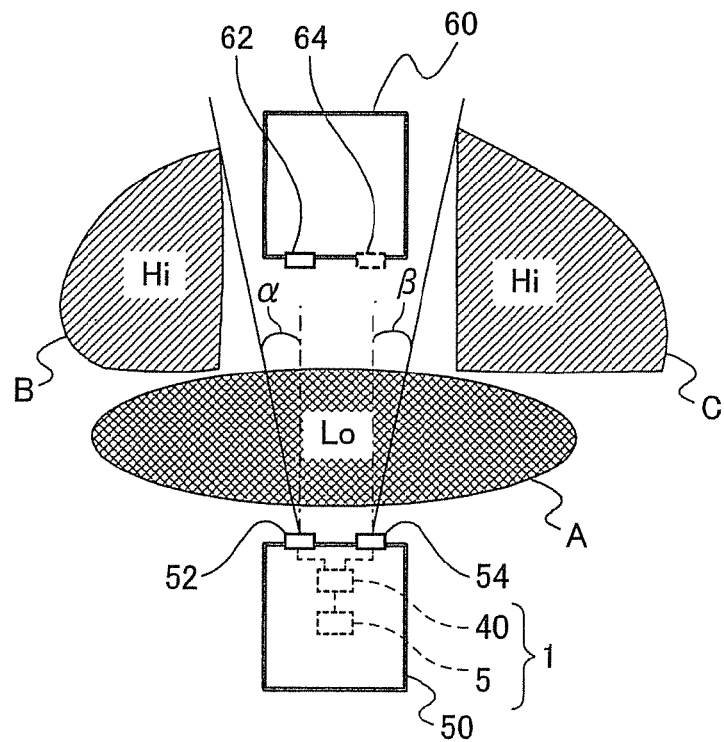
FIG. 2 is an top view of a road surface where the own vehicle and a forward vehicle are present, which aims at explaining a relationship between an irradiation area and the forward vehicle when an irradiation direction of a headlamp is changed.

Next, the irradiation direction of headlamps is described with reference to FIG. 2. FIG. 2 shows a top view of a road surface where the own vehicle 50 and a forward vehicle 60 are present, which aims at explaining a relationship between an irradiation area and the forward vehicle 60 when the irradiation direction of headlamps 52, 54 of the own vehicle 50 is changed.

As shown in FIG. 2, in the low beam, the irradiation direction is set to be downward, i.e., an irradiation angle with respect to the road surface is lower than that of the high beam and the intermediate high beam, so as to irradiate an area of a road surface located closer to the own vehicle 50 (see area A shown in FIG. 2).

In the intermediate high beam, the irradiation direction is set to be upward, i.e., an irradiation angle of the headlamps 52, 54 with respect to the road surface is higher than that of the low beam, so as to irradiate an area further away than the area irradiated by the low beam. Further, in this state, a shielded area capable of shielding an area of the forward vehicle 60 is provided in the irradiated area, and then, areas of only both right and left sides of own vehicle 50 (see areas B and C shown in FIG. 2) are irradiated (i.e., the shielded area is not irradiated) so as to prevent the forward vehicle 60 from being irradiated.

In the high beam, the irradiation direction is set to be upward, i.e., an irradiation angle of the headlamps 52, 54 with respect to the road surface is higher than that of the low beam, and to be forward in front of own vehicle 50, so as to irradiate an area away from the area irradiated by the low beam. Thus, the forward area in front of own vehicle 50 is irradiated, without providing the shielded area as described above.

(Flow of the Light Distribution Process)

Figure 3:
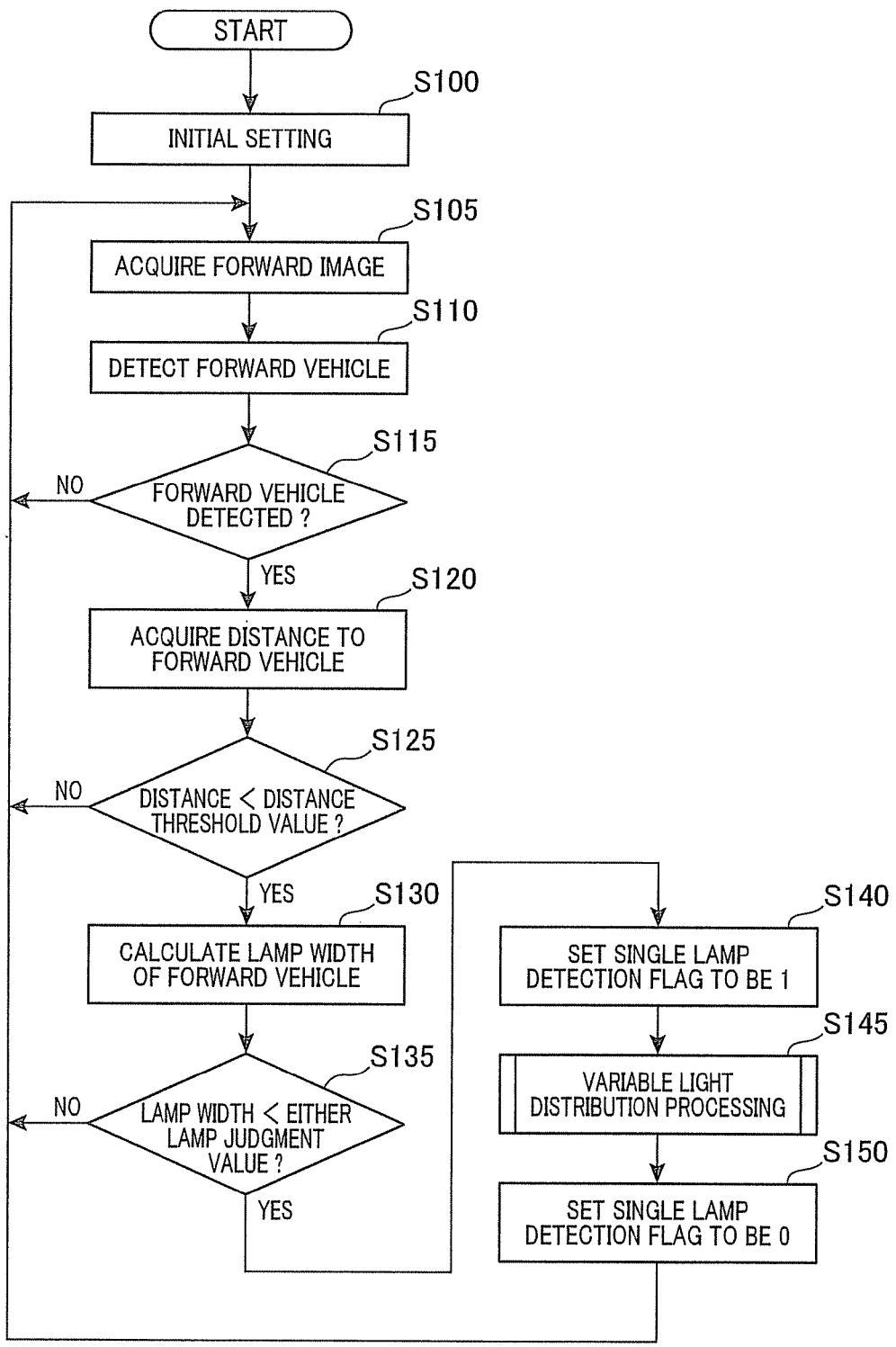
FIG. 3 is a flowchart for showing a main routine of a light distribution process.
Figures 4, 5:
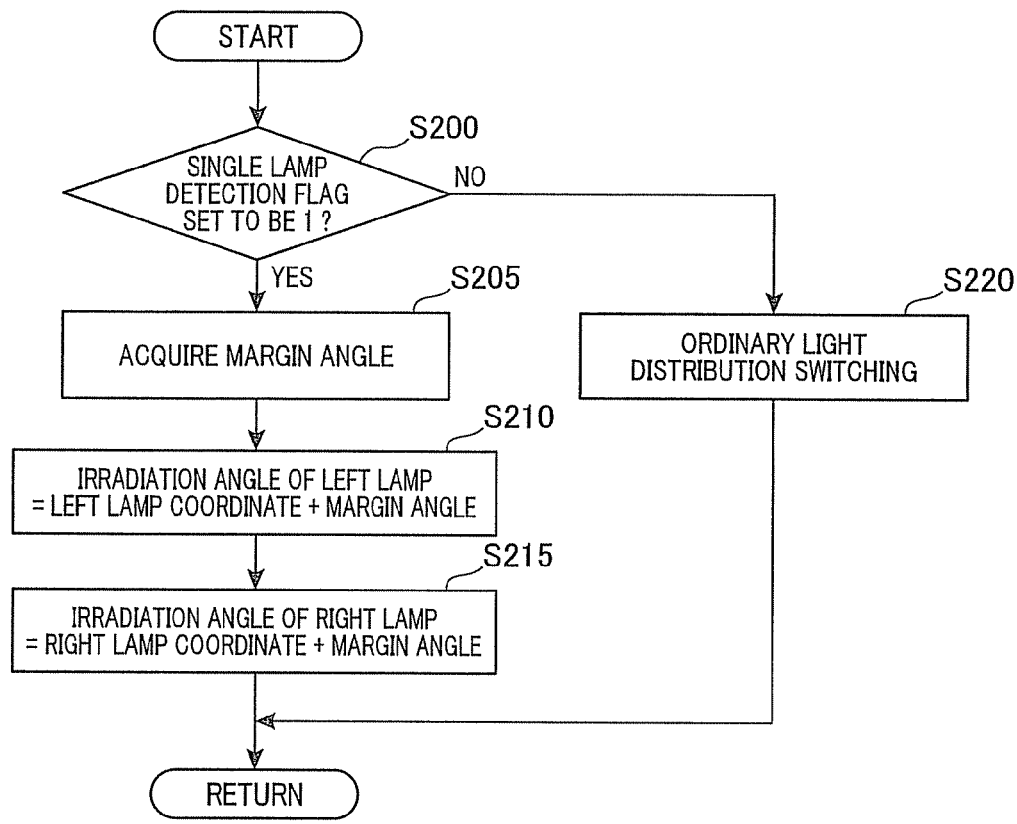
FIG. 4 is a flowchart for showing a subroutine for variable light distribution process called from the main routine of the light distribution process of FIG. 3.
FIG. 5 is a diagram for explaining a margin angle with respect to a distance to the forward vehicle and a lamp width which is a distance between a pair of lamps configuring a lamp mounted on the forward vehicle.

Next, a flow of a light distribution process performed by the headlamp light distribution control device 5 is described, with reference to FIGS. 3 and 4. FIG. 3 shows a flowchart of a main routine of the light distribution process performed by the CPU 301 of the microcomputer 300 configuring the control processing unit 30, and FIG. 4 shows a flowchart of a subroutine (variable light distribution process) called from the main routine of FIG. 3.

In the light distribution process, as shown in FIG. 3, first, at step S100, the CPU 301 performs an initial setting (hereinafter, the following processing steps are performed by the CPU 301). In the initial setting, the CPU 301 obtains a distance threshold value and an either lamp judgment value stored in the ROM 302, and sets an single lamp detection flag to be 0. In the present embodiment, the distance threshold value is set to be 500 [m], and the either lamp judgment value is set to be 0.5 [m].

Then, at step S105, the CPU 301 acquires an image of a forward area of own vehicle from the camera 10, and subsequently, at step S110, performs image processing to extract an image of a part of a forward vehicle 60 from the image of the forward area acquired in step S105. Here, since a well-known method such as an image binarization (image thresholding), Hough transform or color identification can be used as the image processing, a detailed description thereof is omitted.

Then, at step S115, the CPU 301 judges whether or not the forward vehicle 60 is detected in step S110, i.e., whether or not a forward vehicle 60 is extracted by the above image processing. As a result, if the forward vehicle 60 is detected (Yes in step S115), the CPU 301 proceeds to step S120 to perform the following process. If the forward vehicle 60 is not detected (No in step S115), the CPU 301 returns to step S105 to repeat the above light distribution process.

Then, at step S120, the CPU 301 acquires a distance to the forward vehicle 60 from the radar 20, and subsequently, at step S125, judges whether or not the distance to the forward vehicle 60 acquired in step S120 is less than the distance threshold value, i.e., 500 [m].

As a result, if the distance acquired in step S120 is less than the distance threshold value (Yes in step S125), the CPU 301 proceeds to step S130 to perform the following process. If the distance acquired in step S120 is equal to or more than the distance threshold value, the CPU 301 returns to step S105 to repeat the above light distribution process.

Then, at step S130, the CPU 301 calculates a distance between a pair of lamps 62, 64 such as tail lamps mounted in a vehicle body of the forward vehicle 60 based on the part of the forward vehicle 60 extracted in step S110, by using the following image processing.

In the above calculation, the CPU 301 extracts the lamps 62, 64 mounted in the forward vehicle 60 from their brightness characteristic obtained by a well-known image processing method, judges whether or not the lamps 62, 64 is a pair of lamps such as tail lamps, and then, if judged that the lamps 62, 64 is a pair of lamps, recognizes the lamps 62, 64 as the pair of lamps.

Then, the CPU 301 calculates an actual distance between the pair of lamps 62, 64 based on: (a) a distance between the pair of the lamps 62, 64 calculated by using the image; and (b) the distance to the forward vehicle 60 acquired in step S120. The above distance is called a "lamp width" below.

If judged that the lamps 62, 64 is not a pair of lamps by the image processing method, the lamp width is set to be 0 [m].

Then, at step S135, the CPU 301 judges whether or not the lamp width calculated in step S130 is less than the either lamp judgment value. As a result, if judged that the lamp width is less than the either lamp judgment value (Yes in step S135), the CPU 301 proceeds to step S140 to perform the following process. If judged that the lamp width is equal to or more than the either lamp judgment value (No in step S135), the CPU 301 returns to step S105 to repeat the above light distribution process.

Then, at step S140, the CPU 301 sets the single lamp detection flag to be 1, which is associated with an "single lamp lit state", because the lamp width is shorter.

Then, at step S145, the CPU 301 performs a variable light distribution process which is described in detail below.

Then, at step S150, the CPU 301 sets the either lamp detection frag to be 0, and returns to step S105 to repeat the above light distribution process.

Here, an "both lamps lit state" refers to a state where both of a pair of lamps 62, 64 such as headlamps or tail lamps mounted in the forward vehicle 60 are lit. An "single lamp lit state" refers to a state where only one of a pair of lamps 62, 64 is lit due to malfunction thereof etc.

(Flow of the Variable Light Distribution Process)

Next, the variable light distribution process which is a subroutine called from the above main routine (step S145) of the light distribution process, with reference to FIG. 4.

In the variable light distribution process, as shown in FIG. 4, at step S200, the CPU 301 judges whether or not the single lamp detection flag is 1, i.e., whether or not the lamps 62, 64 of the forward vehicle 60 is in the "single lamp lit state". As a result, if judged that the single lamp detection flag is 1 (Yes in step S200), the CPU 301 proceeds to step S205. If judged that the single lamp detection flag is not 1 (No in step S200), the CPU 301 proceeds to step S220.

Then, at step S205, the CPU 301 acquires, from the ROM, a margin angle (described below) associated with: (a) the distance to the forward vehicle 60 acquired in step S120; and (b) the lamp width calculated in step S130.

As shown in FIG. 5, the margin angle is determined in association with the distance to the forward vehicle 60 and the lamp width. Here, for example, (a) when the distance to the forward vehicle 60 is 0 to 10 [m] and the lamp width is 2 [m], the margin angle is set to be 15 [deg], (b) when the distance to the forward vehicle 60 is 10 to 100 [m] and the lamp width is 1 [m], the margin angle is set to be 8 [deg], and (c) when the distance to the forward vehicle 60 is 100 to 500 [m] and the lamp width is 0.5 [m], the margin angle is set to be 5 [deg]. That is, as the distance to the forward vehicle 60 is larger, the lamp width is smaller, and therefore, the margin angle is set to be smaller. In other words, as the distance to the forward vehicle 60 is smaller, the lamp width is larger, and then, the margin angle is set to be larger.

As shown in FIG. 2, when an irradiation direction of the left and right headlamps 52, 54 of the own vehicle 50 is set to be the intermediate high beam as described above, the forward vehicle 60 is required to be covered by the shielded area. That is, the shield area is needed to have a margin with respect to a position of the respective left and right lamps 62, 64 of the forward vehicle 60 (hereinafter, referred to as a "left lamp coordinate (left light source coordinate)" and a "right lamp coordinate (right light source coordinate)", respectively). This margin of the shielded area is determined by the above "margin angle", which refers to an angle of an irradiation direction of the respective left and right headlamps 52, 54 with respect to a front direction of own vehicle 50 in left and right directions (direction parallel to the road surface). In FIG. 2, the "Margin angle" of the respective left and right headlamps 52, 54 is expressed by "α" and "β", respectively (hereinafter, referred to as a "left margin angle α" and "right margin angle β"). The margin angles acquired in step S205 include the left margin angle α and the right margin angle β.

Then, at step S210, the CPU 301 produces an irradiation angle of the left headlamp 52 (left control angle) by adding the left lamp coordinate (left light source coordinate) of the forward vehicle 60 to the left margin angle α acquired in step S205, and produces an irradiation angle of the right headlamp 54 (right control angle) by adding the right lamp coordinate (right light source coordinate) of the forward vehicle 60 to the right margin angle β acquired in step S205. After that, the CPU 301 returns to the main routine of FIG. 3.

The produced irradiation angle of the left and right headlamps 52, 54 is outputted from the control processing unit 30 to the irradiation direction switching device 40, as a command signal including the left and right control angles. Then, according to the command signal, the irradiation direction of the headlamps 52, 54 is controlled through the irradiation direction switching device 40.

At step S220, the CPU 301 performs a process of an ordinary light distribution switching. Here, the "ordinary light distribution switching" refers to a light distribution switching performed without having the margin, which is set as the right and left margin angles α, β, for the shielded area in the irradiation area.

(Feature of the Headlamp Light Distribution Apparatus)

In the headlamp light distribution apparatus 1 as described above, the control processing unit 30 of the headlamp light distribution control device 5 performs an extraction of the lamps 62, 64 of the forward vehicle 60 and a judgment on whether or not the lamps 62, 64 are in the single lamp lit state or in the both lamps lit state, if the distance from own vehicle 50 to the forward vehicle 60 is less than the predetermined value (distance threshold value).

Therefore, the headlamp light distribution apparatus 1 can precisely perform the extraction of the lamps 62, 64 of the forward vehicle 60 and the judgment on whether the lamps 62, 64 is in the single lamp lit state or in the both lamps lit state, by setting the predetermined value based on an image acquisition performance (e.g., resolution) of the camera 10, or a method (image processing method) for extracting the forward vehicle 60.

When the headlamps 52, 54 of the own vehicle 50 are lit, if judged that the lamps 62, 64 of the forward vehicle 60 are in the both lamps lit state, the shielded area (first shielded area) is set in the irradiation area of the headlamps 52, 54 of own vehicle 50 so as to prevent an area including the lamps 62, 64 of the forward vehicle 60 from being irradiated. This can prevent a driver of the forward vehicle 60 from being dazzled by the headlamps 52, 54.

On the other hand, if judged that the lamps 62, 64 of the forward vehicle 60 are in the single lamp lit state, there is a high probability that only one the lamps 62, 64 of the forward vehicle 60 is not lighting due to, e.g., malfunction. In this case, it is difficult to realize which lamp of the lamps 62, 64 on the right and left sides of the forward vehicle 60 has malfunctioned. Due to this, the shielded area (second shielded area) is set to have a right and left margins larger than the shielded area (first shielded area) set when the lamps 62, 64 is judged as being in the both lamps lit state.

Then, even if it is known which lamp of the lamps 62, 64 on the right and left sides of the forward vehicle 60 has malfunctioned, the forward vehicle 60 cannot be irradiated. This can also prevent a driver of the forward vehicle 60 from being dazzled by irradiation of the headlamps 52, 54.

Thus, the headlamp light distribution apparatus 1 can precisely perform the judgment on whether the lamps 62, 64 of the forward vehicle 60 is in the single lamp lit state or in the both lamps lit state, and therefore, the irradiation area of the headlamps 52, 54 can be set in an appropriate range.

In addition, the control processing unit 30 calculates the distance between the lamps 62, 64 of the forward vehicle 60, judges that the lamps 62, 64 are in the single lamp lit state if the distance is less than the predetermined value, and judges that the lamps 62, 64 are in the both lamps lit state if the distance is equal to or more than the predetermined value. A use of this simple process can make it possible to precisely judge whether the lamps 62, 64 of the forward vehicle 60 are in the single lamp lit state or in the both lamps lit state.

Further, the control processing unit 30 changes the right and left margin angles for the shielded area to be larger, as the distance from own vehicle 50 to the forward vehicle 60 acquired by the radar 20 is smaller. Thus, the right and left margins of the shielded area are smaller, as the distance is larger. This can make it possible to prevent the right and left margins of the shielded area from being too large, even if the forward vehicle 60 is far away from own vehicle 50.

Here, the forward vehicle 60 refers to a vehicle which runs in front of own vehicle 50 such as a preceding vehicle running in the same direction as own vehicle 50 or an oncoming vehicle running on the opposite lane.

The embodiment of the present invention is not limited in any way to the above-described embodiment. Various embodiments are possible as long as the embodiment belongs to the technical scope of the present invention.

For example, in the above-described embodiment, the radar 20 is used for acquiring a distance from own vehicle 50 to the forward vehicle 60. Instead, vehicle-to-vehicle communication between own vehicle 50 and the forward vehicle 60 may be used for acquiring a distance from own vehicle 50 to the forward vehicle 60.

In the headlamp light distribution control device 5, the camera 10 corresponds to an image acquisition unit, the radar 20 corresponds to an distance acquisition unit, the control processing unit 30 corresponds to an extraction unit (step S105, S110), a judgment unit (steps S115-S140), and a control unit (steps S145, S150, S200-S215). This configuration is not limited to a specific one. However, as long as the above-described function of each unit can be realized, any kind of configuration can be applied.

What is claimed is:

1. A headlamp light distribution control device for a vehicle, the headlamp light distribution control device comprising:

an image acquisition unit configured to acquire an image of a forward area of an own vehicle;

an extraction unit configured to extract a forward vehicle from the image of the forward area acquired by the image acquisition unit;

a distance acquisition unit configured to acquire a distance from the own vehicle to the forward vehicle;

a judgment unit configured to extract a lamp configured by a pair of lamps mounted in the forward vehicle from the image of the forward vehicle extracted by the extraction unit if the distance from the own vehicle to the forward vehicle acquired by the distance acquisition unit is less than a predetermined value, and judge whether the extracted lamp is in a both lamps lit state where both of the pair of lamps are lit or in a single lamp lit state where only one of the pair of lamps is lit; and a control unit configured to set a shielded area in an irradiation area of a headlamp of the own vehicle so as to prevent an area including the lamp of the forward vehicle from being irradiated if the judgment unit judges that the extracted lamp is in the both lamps lit state, and set a shielded area in the irradiation area of the headlamp of own vehicle so as to have a margin in right and left directions larger than the shielded area set upon the both lamps lit state if the judgment unit judges that the extracted lamp is in the single lamp lit state.

2. The headlamp light distribution control device according to claim 1, wherein the judgment unit is configured to calculate a distance between the two lamps of the extracted lamp;

judge that the extracted lamp is in the single lamp lit state if the distance is less than a predetermined value, and judge that the extracted lamp is in the both lamps lit state if the distance is equal to or more than the predetermined value.

3. The headlamp light distribution control device according to claim 1, wherein the control unit is configured to change the margin in right and left directions to be larger, as the distance from the own vehicle to the forward vehicle acquired by the distance acquisition unit is smaller.

4. The headlamp light distribution control device according to claim 2, wherein the control unit is configured to change the margin in right and left directions to be larger, as the distance from the own vehicle to the forward vehicle acquired by the distance acquisition unit is smaller.

* * * * *